Aug. 5, 1941.         N. H. SCHERMER         2,251,555
FRICTIONLESS ROLLER BEARING
Filed May 25, 1939
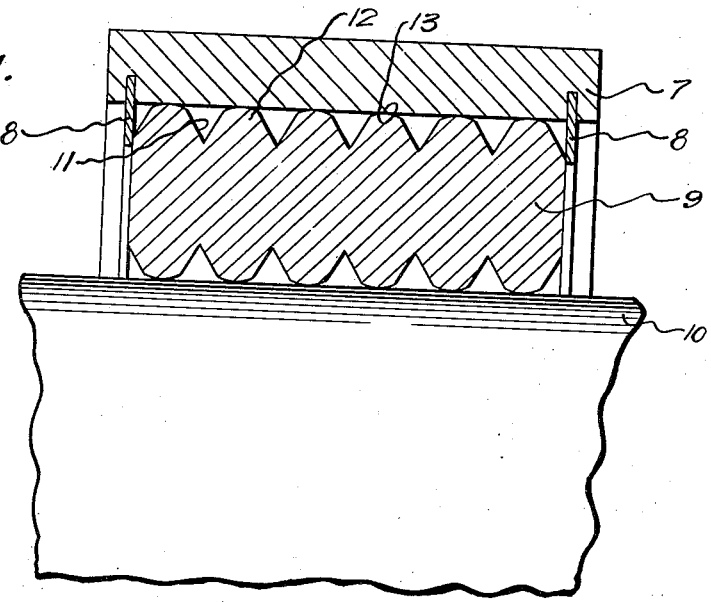
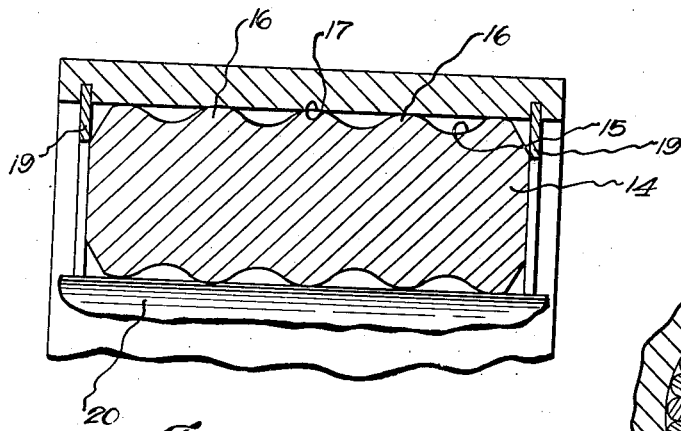
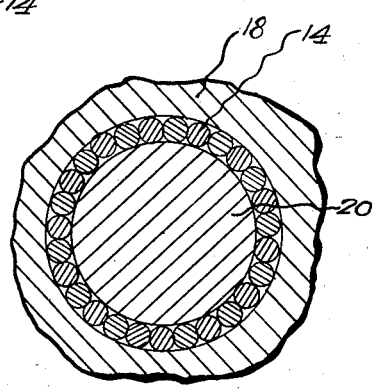
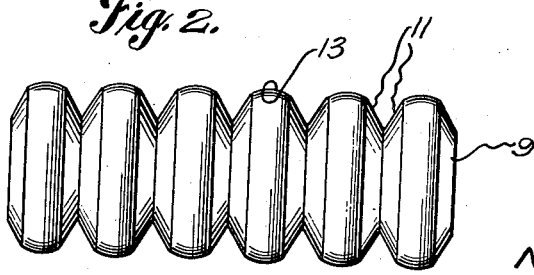
INVENTOR.
NATHAN H. SCHERMER.
BY Thos. Donnelly
ATTORNEY.

Patented Aug. 5, 1941

2,251,555

UNITED STATES PATENT OFFICE 2,251,555

FRICTIONLESS ROLLER BEARING

Nathan H. Schermer, Detroit, Mich.

Application May 25, 1939, Serial No. 275,645

2 Claims. (Cl. 308—215)

My invention relates to a new and useful improvement in a frictionless roller bearing adapted for roller bearings generally but particularly adapted for use on needle bearings or roller bearings of a very small diameter. Experience has shown that it is difficult to produce a satisfactory needle roller bearing which will operate under usual conditions over a prolonged period of time. This is largely due to the fact that the periphery of the roller bearing, throughout the length of the roller bearing, is in contact either with the retainer or race and the periphery of the rotating shaft with which the bearing is used. There is thus provided a large area of frictional contact. For efficient operation, it is desirable that this area of frictional contact be reduced to a minimum while the desired support of the bearing be retained and, It is an object of the present invention to accomplish this.

Another object of the invention is the provision of an elongated roller bearing having a plurality of peripheral grooves or notches formed therein, providing a plurality of spaced-apart engagement portions which serve as the engaging parts of the roller bearing.

It is another object of the present invention to provide a roller bearing having a plurality of spaced-apart engagement portions presenting to the engaged portions a substantially spherical surface.

Another object of the invention is the provision of a roller bearing having lubricant retaining grooves or cavities provided throughout its length.

Another object of the invention is the provision of a roller bearing of this class which will be simple in construction, economical of manufacture, durable, highly efficient in use, easily lubricated, and of a great length of life in operation.

Other objects will appear hereinafter.

It is recognized that variations and modifications departing from the specific structure illustrated may be made in the present invention without departing from the general spirit of the invention and it is the intention to embrace such variations within the specification and claims set out herein.

For the purposes of more clearly illustrating the invention, I have included as a part of this specification, drawing in which, Fig. 1 is a longitudinal, central, sectional view of the invention showing it applied, Fig. 2 is a side elevational view of the invention, Fig. 3 is a longitudinal, central, sectional view of a slightly modified form of the invention showing it applied, Fig. 4 is a transverse sectional view of the invention showing it applied.

In Fig. 1, I have illustrated the invention used with a rotating shaft 10 about which is positioned a race or retaining ring 7 carrying the side retainers 8 which serve to retain the roller bearings in position. Each of these roller bearings comprises an elongated body 9 formed from suitable material and in the forms shown in Fig. 1, I have provided in the periphery of the body 9, spaced grooves 11 to establish the outwardly projecting ribs 12 and the outer face of these ribs 12 are curved to provide a spherical face 13, the arc extending circumferentially of the body 9 being struck on the same radius as the arc extending axially of the body 9. By forming the outer face 13 in this manner the minimum surface of contact between the outer face 13 and the inner surface of the ring 7 and the periphery of the shaft 10 is provided. Thus, I have provided a roller bearing in which the area of contact between the bearing and the associated parts, such as the retainer and rotating shaft, is reduced to a minimum. By forming this contact face spherical in contour, I have, while reducing the area of contact to a minimum, obtained the advantages of a roller bearing and a ball bearing. Moreover, by providing the grooves 11, I have provided means for retaining grease or other suitable lubricant in position for retaining the roller properly lubricated and thus reducing the wear thereon to a minimum. Experience has shown that a roller bearing constructed in this manner, while being light, may be easily and quickly assembled, retained properly lubricated at all times and is one which is most efficient.

In Fig. 3, I have illustrated the roller bearing comprising an elongated body 14 having the peripheral grooves 15 formed therein to provide the spaced-apart outwardly projecting portions 16, the outer face 17 of which is formed of spherical contour which will be adapted to engage the inner surface of the ring 18 and the periphery of the shaft 20, the retaining side plates 19 serving to retain these rollers in position. The same advantages referred to are found in the structure illustrated in Fig. 1 are also present in the structure illustrated in Fig. 3.

The roller illustrated may be formed from a cylindrical roller bearing. In the views shown in Fig. 1 the body 9 of the roller bearing may be milled with the grooves 19 formed therein. A milling operation may also be resorted to, to produce the forms shown in Fig. 3. This structure may, however, be produced by a rolling operation whereby the grooves are rolled into the cylindrical body.

In use, an axial shifting or tilting of the roller relatively to the rotating shaft with which used might under certain conditions be effected. With the body 9 or the body 14 shifted out of axial alignment with the shaft 10 or 20, the roller bearing would still contact the periphery of the shaft with a spherical surface. Due to the single point contact, even when the roller is so axially shifted, a free and easy running of the roller bearing will be effected and the diminished friction which is sought would be obtained. This could not be accomplished with a roller bearing having a plain cylindrical surface.

What I claim as new is:

1. A structure of the class described embodying a roller bearing of the class described, comprising: an elongated substantially cylindrical body having a plurality of axially spaced circumferentially extending V-shaped grooves formed therein, the periphery of said body between said grooves being of a contour curving circumferentially and axially of said body, said body, at its opposite ends, terminating at the base of a groove; and a retaining ring engaging, adjacent the inner edge of one of its faces, an end face of said rollers adjacent the perimeter thereof.

2. A bearing of the class described, comprising: a plurality of elongated substantially cylindrical bodies each having a plurality of axially spaced circumferentially extending grooves formed therein, the periphery of the body between said grooves being of a contour curving circumferentially and axially of said body, said body terminating, at its opposite ends, at the base of a groove, said bodies being arranged in contact with each other to provide a circular formation; a cylindrical retaining ring embracing said circular formation, the inner surface of said ring being engaged by the periphery of said bodies providing said circular formation; and a side retaining ring at opposite ends of said first-mentioned retaining ring secured thereto and engaging, adjacent the inner edge of one face, with the opposite end faces of said bodies adjacent their perimeters.

NATHAN H. SCHERMER.